(12) United States Patent
Appel (10) Patent No.: US 12,061,733 B2
(45) Date of Patent: Aug. 13, 2024

(54) OPTICAL ACQUISITION SYSTEM AND PROBING METHOD FOR OBJECT MATCHING

(71) Applicant: Microscopic Image Recognition Algorithms Inc., San Francisco, CA (US)

(72) Inventor: Ron Appel, San Francisco, CA (US)

(*) Notice: Subject to any disclaimer, the term of this patent is extended or adjusted under 35 U.S.C. 154(b) by 129 days.

(21) Appl. No.: 17/623,423

(22) PCT Filed: Jun. 20, 2020

(86) PCT No.: PCT/US2020/040189
§ 371 (c)(1),
(2) Date: Dec. 28, 2021

(87) PCT Pub. No.: WO2020/264525
PCT Pub. Date: Dec. 30, 2020

(65) Prior Publication Data
US 2022/0351492 A1    Nov. 3, 2022

Related U.S. Application Data

(60) Provisional application No. 62/868,037, filed on Jun. 28, 2019.

(51) Int. Cl.
*G06F 21/88* (2013.01)
*G06V 10/141* (2022.01)
(Continued)

(52) U.S. Cl.
CPC ............ *G06F 21/88* (2013.01); *G06V 10/141* (2022.01); *G06V 10/145* (2022.01); *G06V 10/764* (2022.01); *G06V 20/64* (2022.01)

(58) Field of Classification Search
CPC ....... G06F 21/88; G06F 21/44; G06V 10/141; G06V 10/145; G06V 10/764; G06V 20/64
See application file for complete search history.

(56) References Cited

U.S. PATENT DOCUMENTS

2015/0169638 A1* 6/2015 Jaber .................. G06F 16/5854
                                                      707/749
2018/0149603 A1* 5/2018 Bhattacharyya ..... G01R 31/311
(Continued)

*Primary Examiner* — Michael E Teitelbaum (57) ABSTRACT

This invention presents a system and method to acquire object measurements with and optical device and axial scanning mechanism, and to subsequently implement a digital processing algorithm to establish a match between similar object measurements acquired in the past. The digital processing algorithm consists of a probe-and-match strategy. It is generally challenging to determine whether or not an object, such as a work of art (e.g., a painting, drawing, sculpture, or collectable item), is the exact same object as something viewed previously with an extremely high degree of confidence. There is the potential for one object to look very similar to another object, but not be the same (i.e., to be a forgery). There is also the potential for one object to be the same object as viewed previously, but have changed significantly over time (e.g., aged or damaged). Being able to distinguish between these two cases is a difficult yet important task. This invention aims to address the challenge of identifying object uniqueness by considering it as a matching problem between optical measurements, wherein multiple acquired measurements from many objects must be sifted through to establish how similar they are, if at all, to any new measurements.

16 Claims, 7 Drawing Sheets

(51) Int. Cl.
    *G06V 10/145*     (2022.01)
    *G06V 10/764*     (2022.01)
    *G06V 20/64*     (2022.01)

(56) References Cited

U.S. PATENT DOCUMENTS

| | | | | |
|---|---|---|---|---|
| 2019/0156113 | A1* | 5/2019 | Binsaadoon | G06F 18/2411 |
| 2019/0171908 | A1* | 6/2019 | Salavon | G06N 3/088 |
| 2021/0232851 | A1* | 7/2021 | Redford | G06V 20/588 |

* cited by examiner

OPTICAL ACQUISITION SYSTEM AND PROBING METHOD FOR OBJECT MATCHING

TECHNICAL FIELD

This invention relates to a system and method to acquire optical data from a three-dimensional object and process it with a computing system to establish object uniqueness.

BACKGROUND ART

The art industry is multi-billion-dollar per year market and relies on the trusted exchange of valuable objects such as paintings, drawings, and sculptures. In recent years, there have been a number of high-profile cases of art forgery, wherein one object that was sold or exchanged was not the same object as the party had originally thought or agreed upon. A related cause of concern is the increasing accuracy of 3D printing, which is now approaching the micrometer regime and can be achieved with a wide variety of materials. This continued erosion of trust is troublesome and new technology is needed to ensure that buyers, sellers, and the general public as a whole can agree upon object authenticity.

To address these concerns, we propose here an optical system and method to establish whether or not an object is the same object as when examined previously, or if it is a different object that only appears to be the same to the naked eye. This invention is specifically aimed at achieving this task with three dimensional objects that are not flat. There are a number of prior attempts at creating such an authentication device. One set of examples attach unique physical markers (i.e., watermarks) to the artwork, including dynamic watermarks [Fraser], DNA-based tags [Jung], and particles that can be observed optically [Bi]. Another set of examples are devices that passively observe objects for authentication. These methods include inventions that use radiometric measurement (e.g., for carbon dating) methods [Riederer] or terahertz radiation [Dong]. Optical devices are another popular way to passively measure an object to assess its uniqueness. Some of these methods rely on standard images or photographs [Hwang] to assess a painting's style, which can then help attribute the painting to a particular artist. While several computer algorithms have attempted to achieve attribution with a certain level of accuracy [ElGamal] [Strezowksi], this invention does not consider the attribution problem. Other related optical methods examine a small patch of an object, such as a piece of paper, at high resolution. Some have used a standard camera [Ito], while others have used a standard camera with laser-type coherent illumination [DiVenuto]. These prior works are primarily concerned with acquiring two-dimensional images, as opposed to 3D optical information.

In this work, we use a unique optical setup to acquire optical information from a much larger area than from a standard camera, with multispectral illumination and in three dimensions, which we couple with computational processing to help establish a tunable confidence level of object uniqueness.

SUMMARY OF INVENTION

This patent concerns a process to measure and match similar three-dimensional objects, through the rapid acquisition and computational processing of optical information from the entire surface of objects, via an acquisition device and post-processing. The invention is comprised of two inter-connected features: the acquisition hardware, and the data post-processing software. Below, we give a general outline of each of these features, and explain how the two work together in a feedback loop to efficiently arrive at a confidence level for determining three-dimensional object uniqueness.

Figure 1:
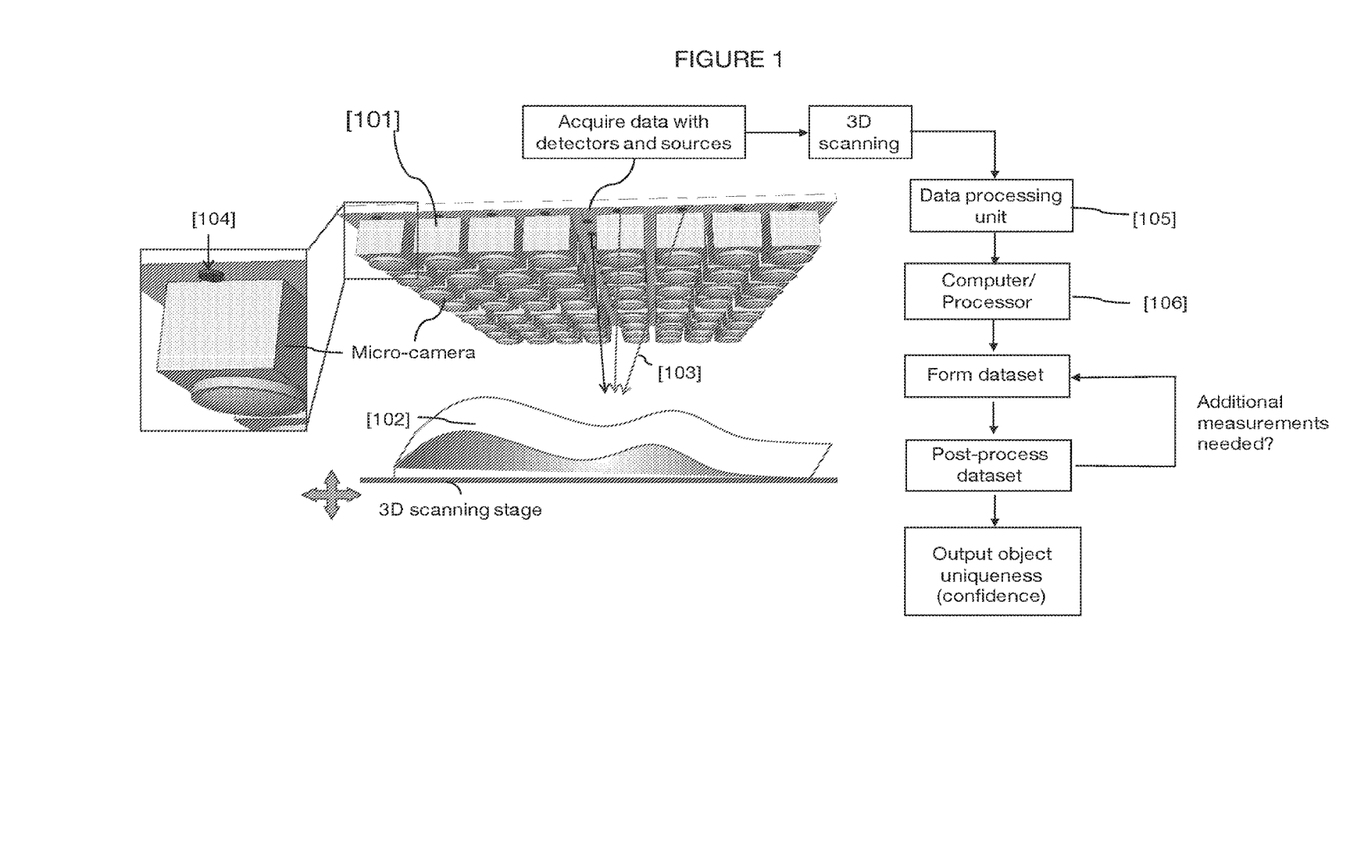
FIG. 1 shows an acquisition device configured to obtain optical measurements from objects of interest.

The general outline of the invention is sketched in FIG. 1. Here, the acquisition device [101] acquires a number of optical measurements from an object of interest [102], which can be three-dimensional with a non-planar surface, where the goal is to establish the uniqueness of the object of interest (i.e., to determine if the current object is the same as an object that has been seen previously). Patterned Illumination [103] can be delivered from optical illumination sources [104]. After data acquisition, the optical measurements are passed to a computer [106] via a data processing unit [105]. The computer compiles the data into a dataset, and post-processes this dataset to establish a uniqueness score. Feedback is provided to the dataset generation process, and more measurements are acquired as needed. The final output is a uniqueness score with a specific confidence level.

Technical Problem and Solution

To measure and obtain a set of match scores for similar three-dimensional objects, this invention utilizes the following key components of a data acquisition device and a data post-processing process, as described in detail below.

A. Data Acquisition Device

First, this invention relies on an optical acquisition device to obtain optical measurements from each 3D object of interest. Optical measurements consist of the measurement of any radiation extending from ultraviolet (200 nm wavelength) to the near infrared (3 µm wavelength).

Measurement here implies the conversion of optical radiation into an electrical signal that is digitized for subsequent processing via an optical detector. The acquisition device contains 3 primary components: 1) a multi-aperture lens and optical detector array, 2) a three-dimensional scanner, and 3) a patterned illumination generator. Below are further details about each primary component.

1) multi-lens and optical detector array: The multi-aperture overlapping lens and optical detector array is critical to rapid acquisition of high-resolution information from the entire artwork surface. This component is outlined in FIG. 1. It consists of more than one lens and optical detector array (e.g., a charge-coupled device (CCD) or a complimentary metal on oxide semiconductor (CMOS) sensor). Each lens and optical detector array is coupled together into a small package, where the lens focuses radiation onto the optical detector array, to form what we term a micro-camera. Each micro-camera lens is positioned such that its object-side focal plane (i.e., its focus) is near to the surface of the object, but not necessarily at the surface, since the object is three-dimensional and there is no flat 2D surface to focus onto. High-resolution includes the ability to obtain information about object features that range from 50 µm in size down to less than 1 µm in size.

Figure 2:
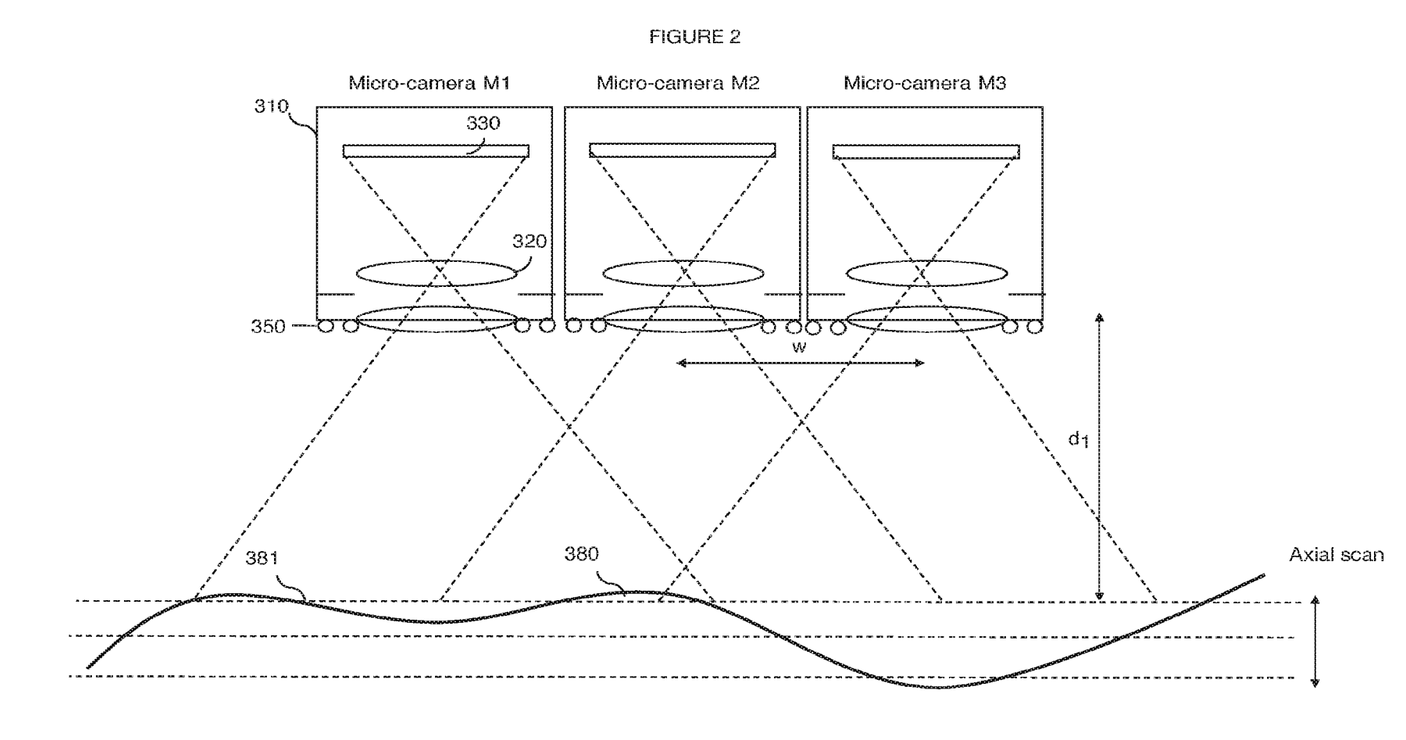
FIG. 2 shows a lens and optical detector array configuration for 3 lenses and detectors in a 2D flat plane sketch geometry.

An example of this type lens and optical detector array configuration for 3 lenses and detectors (i.e., 3 micro-cameras), positioned next to one another in a 2D flat plane sketch geometry for simplicity, is shown in FIG. 2. In this one preferred embodiment, each micro-camera [310], which contains an optical detector array [330] and one or more imaging lenses [320] captures optical radiation from a particular surface area of the object of interest [380], such that the particular surfaces or areas of interest overlap with one another. Radiation is delivered from one or more illumination light sources [350]. For example, the point on the object marked [380] is imaged by both micro-camera 1 and micro-camera 2, and is thus in an overlapping region. The point on the object marked [381] is only imaged by micro-camera 1, so is not in an overlapping region. Radiation from a particular surface area of the object of interest such as [381] may not overlap with the surface area captured by any other micro-camera, in which case mechanical scanning may be used to sequentially acquire information from different areas of the object within each micro-camera unit optical information from the entire surface of the object has been collected. In either case, FIG. 2 shows how each micro-camera is not necessarily focused on the surface of a flat 2D object, but instead focused either somewhere above or below the surface of the object. In other words, this invention does not require that the lens and optical detectors are in an in-focus imaging configuration.

In any general arrangement of this invention, the micro-cameras are positioned together in an array, adjacent to one another, and are physically connected to each other in a single integrated hardware piece. The array can be in the form of a Cartesian grid (e.g., a square grid of 3×3 or 8×12 micro-cameras), or the array can have hexagonal packing, or any other type of packing strategy. The array of lenses and sensors may also be curved inwards (to capture data from a smaller area of the object) or curved outwards (to capture data from a larger area of the object).

2) 3D scanning mechanism: A critical component of this invention is its ability to verify object uniqueness for 3D objects. One of the primary mechanisms that enables this is this invention's 3D mechanical scanning stage. This stage is used to move either the sample, or the multi-lens and optical detector array, or both. The scanning stage can move the object and/or detector array laterally with respect to one another (i.e., across the x-y plane). Critically, it can also move the object and/or detector array axially with respect to one another (i.e., closer or further apart, along the z-axis). This latter movement helps the system acquire what we term an "axial scan", which is a set of optical measurements acquired with the object and/or detector at more than one different z-axis positions. 3 unique axial scan positions are shown in FIG. 2. In a second preferred embodiment, the axial scan can be acquired by moving just the lens component of each micro-camera along the z-axis, while the optical detector and object do not move. Movement of the lens can be achieved via a piezo-stage, or with an electro-wetting lens whose surface deflects a small amount along the z-axis. In a third preferred embodiment, the axial scan can be acquired by moving just the optical detector component of each micro-camera along the z-axis, while the lens and object do not move. Movement of the optical detector can be achieved via a piezo-stage, for example. It is also possible to combine movement components from the various embodiments above to create an axial scan.

Figure 3:
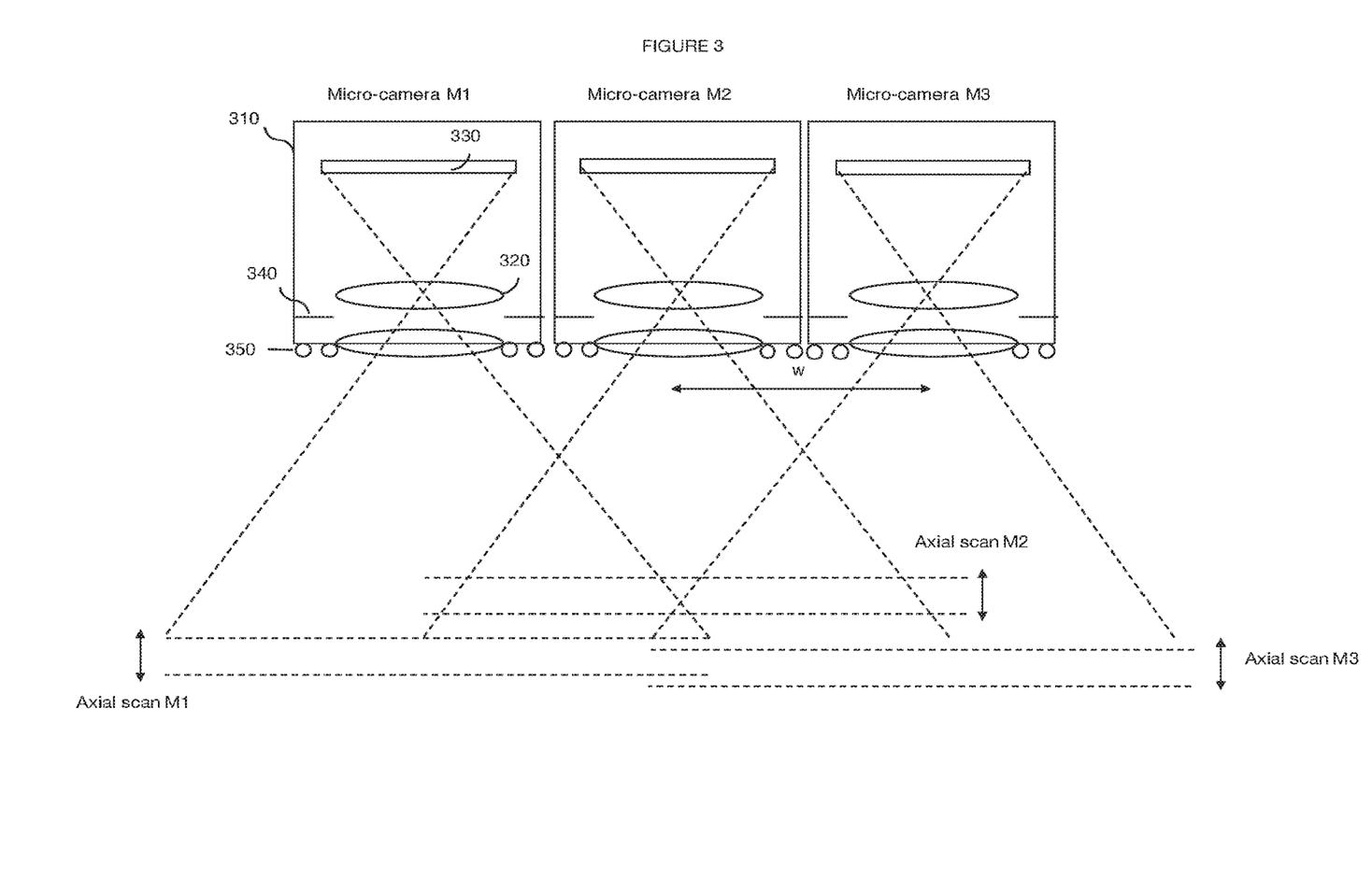
FIG. 3 shows a lens and optical detector array configuration with each lens focused at a different axial plane.

In any case, the axial scan mechanism enables a unique configuration of lenses and optical detectors, which is sketched in FIG. 3. In this preferred embodiment, each lens is focused at a different axial plane than the focus of the lens in adjacent micro-cameras. This helps with a critical challenge in micro-camera design for imaging 2D objects, which is to ensure that the focal plane of each micro-camera is at the same axial position. By not requiring this condition, the design tolerances for the lens and optical detector array become dramatically simpler. In addition, movements, vibrations, and/or other changes over time to each lens are no longer important. This greatly relaxed design enables our proposed invention to operate in new environments, for example on un-damped tables, on a moveable gantry to acquire optical information from vertically oriented objects, or even as a hand-held device. In the latter situation, axial scanning may be achieved by movement of the lens (i.e., via electro-wetting lenses) and/or the sensor (i.e., via a piezo-stage), for example.

Finally, this component also consists of one or more dedicated processors to interface with the digital image sensors to transmit measured data from the digital image sensors to the computer (Data Processing unit, FIG. 1), and possibly to control the 3D scanning stage and the patterned illumination system described below. In its simplest form, these processing units can aggregate data from each of the optical detectors to send to a dedicated computing device. It can take the form of a dedicated ASIC chip, a field-programmable gate array (FPGA), a graphics processing unit (GPU), a tensor processing unit (TPU), or some other form of dedicated computing device. Data aggregation will typically require translation from one data format to another. For example, translation from the MIPI format that is output from a standard CMOS optical detector array, into another format like USB3 or PCIe, may be required to transmit the acquired optical measurements to a computing unit for subsequent processing. In a more complex form, this data processing unit can additionally perform data pre-processing steps on the acquired optical measurements. Examples include image compression, denoising, deconvolution, image stitching, or any of a variety of simple computational operations that help prepare the acquired optical measurements for subsequent analysis by a computing device.

3) Patterned illumination unit: This invention includes a patterned illumination unit to shine optical radiation onto the object at varying brightness from multiple positions, angles and at multiple wavelengths of light. By shining light from a plurality of positions, angles and wavelengths and acquiring one or more measurements from each optical detector array, this invention can extract additional information from each 3D object under investigation to help create an accurate authentication. The combination of the specific brightness levels (i.e., the radiant intensities) of each light source within the patterned illumination unit define what we term a "pattern" of light. This invention shines one or more patterns of light onto each object while acquiring images.

Figure 4:
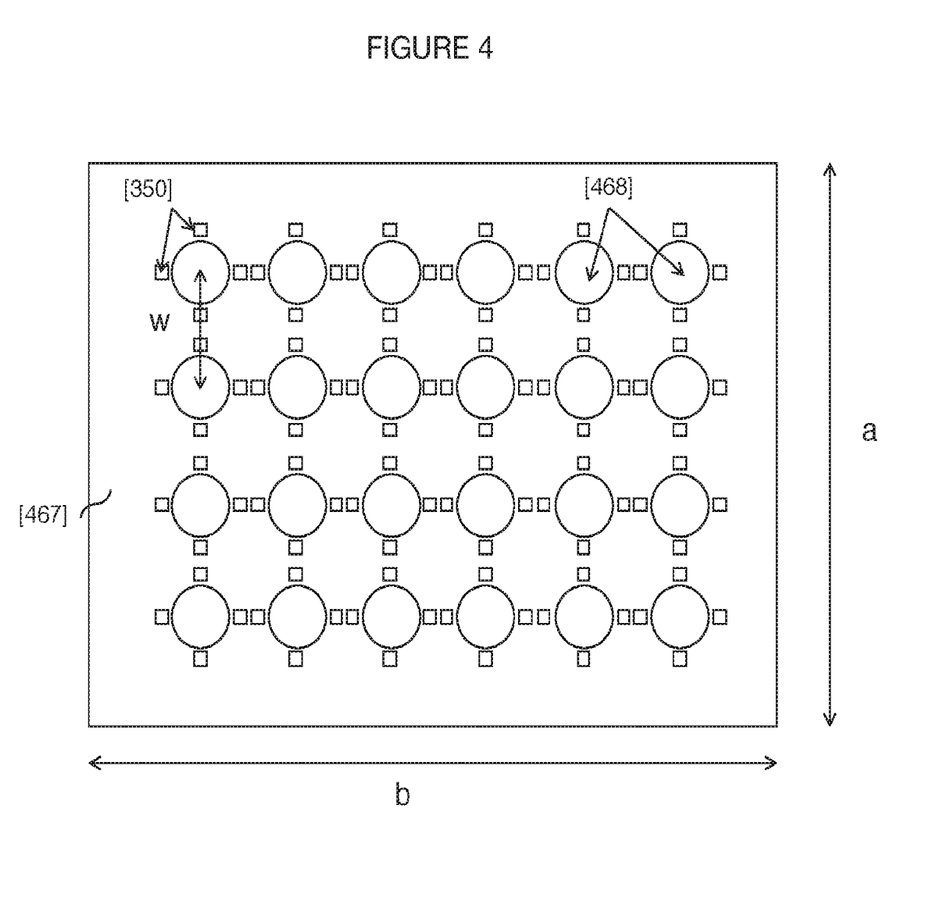
FIG. 4 shows a layout of light sources for inclusion with the lens and sensor array.

The wavelengths that can irradiate the sample can range from 200 nm to 5 µm. The light sources may take the form of light emitting diodes (LEDs), micro-LEDs, laser diodes, vertical cavity surface emitting lasers, thermal sources, or any other type of compact radiation source. In one preferred embodiment, the patterned illumination component consists of an array of 10 or more light sources that can illuminate the object from a variety of positions, angles and with a variety of wavelengths. The light sources can be integrated with the lens and optical detector array, as shown in FIG. 1, or they can be positioned separately from the lens and optical detector array. An example layout of light sources for inclusion with the lens and sensor array is shown in FIG. 4, which includes 4 optical radiation sources [350] surrounding each area where a micro-camera lens would be positioned, and the radiation sources are integrated on a printed circuit board [467], and the printed circuit board has transparent holes for the micro-cameras to image through [468]. The height and width dimensions marked a and b can be 8 cm and 12, for example. The patterned illumination component can provide any combination of illumination from beneath the object (if the object is semi-transparent), illumination from above the object as shown in FIGS. 1-3, or illumination from the side of the object. The patterned illumination can thus provide bright-field, dark-field, and/or phase-contrast type illumination to the object.

Figure 5:
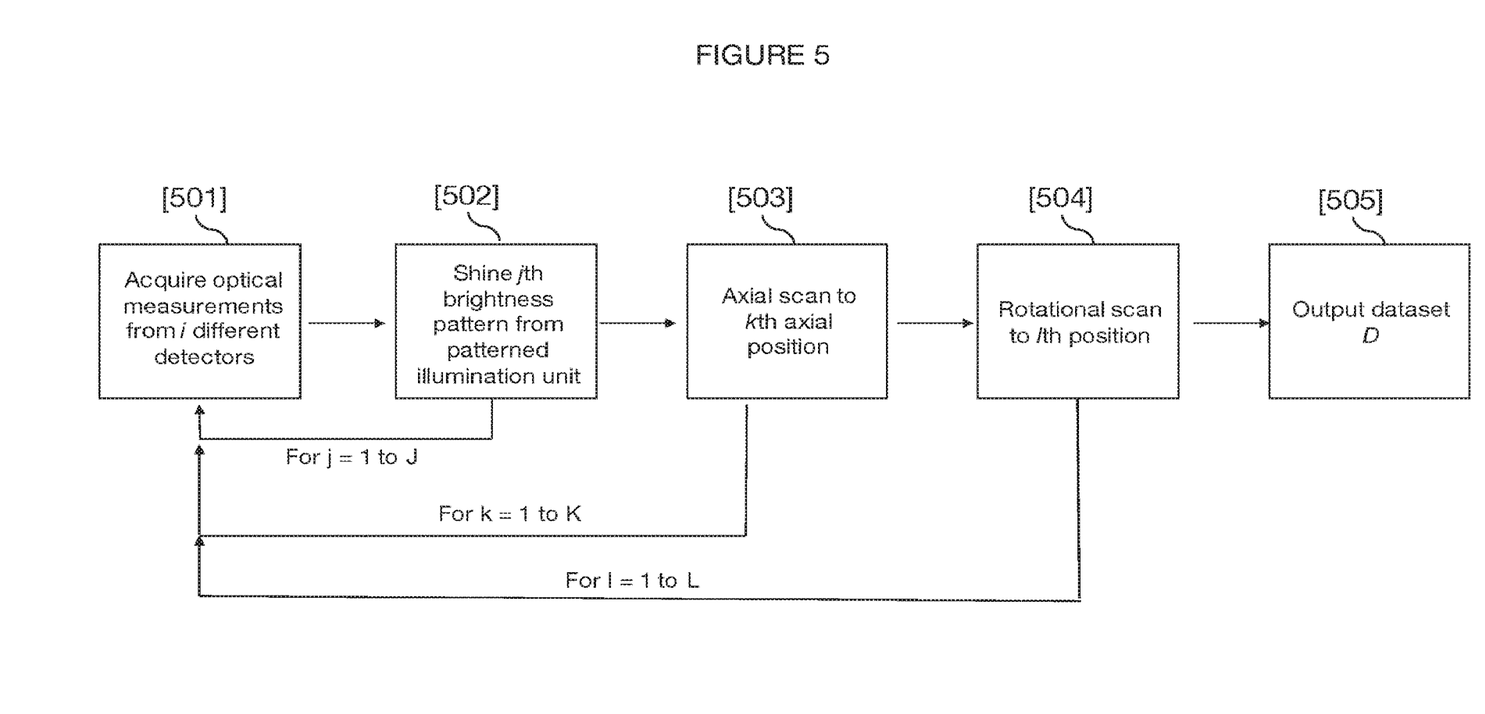
FIG. 5 shows an initial data acquisition workflow for generating an output dataset of the form D(x, y, micro-camera, illumination pattern, axial scan, rotational scan).

A typical initial data acquisition workflow for one preferred embodiment of this invention is presented in FIG. 5. When presented with a new object that is supposed to be matched with prior scanned objects to determine if the object is unique, the acquisition device will first execute a pre-defined set of acquisition operations to acquire an "initial dataset" [501]. These operations include 1) with one illumination pattern, imaging from i different optical sensors out of I total sensors within the lens and optical sensor array and saving each measurement indexed as $D(x,y,i)$, where $(x,y)$ denote the coordinates of the array of the optical detectors along two dimensions x and y. Here, D is a 3D array of digital numerical values. 2) the system automatically changes the illumination pattern to a different pattern and acquires the jth uniquely illuminated measurement, $D(x,y,i,j)$, for j=1 to J in [502]. In other words, the system acquires J different sets of measurements from the i optical detectors, where the illumination is varied between each acquisition. 3) The system repeats the operations in (1) and (2) for a set of axial scan positions in [503], ranging in index from k to K, to create the 5D dataset $D(x,y,i,j,k)$. (4) The system repeats the operations in (1), (2) and (3) for a set of rotations positions in [504], ranging in index from 1 to L, to create the 6D dataset $D(x,y,i,j,k,l)$. The result of the operations will be an output dataset of the form D(x, y, micro-camera, illumination pattern, axial scan, rotational scan) for initial post-processing in [505].

As described below, based upon feedback from initial post-processing steps, additional data can then be acquired to enhance the dataset D(x, y, micro-camera, illumination pattern, axial scan, rotational scan) along any of its last four dimensions.

B. Data Post-Processing Process

The acquisition device described above is used to acquire an initial dataset, D. After acquisition, the invention then executes post-processing on the initial dataset D. There are aims of post-processing: 1) to ensure that the acquired data is of high enough fidelity for the goal of assessing object uniqueness or if more data must be acquired, 2) to determine whether there is enough data to confidently assess object uniqueness or if more data must be acquired, and 3) to assess object uniqueness within a particular confidence level based upon a matching algorithm. To achieve these goals, this invention's post-processing consists of 5 inter-related tasks, as detailed below: latent representation transformation, category assignment, axial offset analysis, probe matching and confidence analysis. Details about each of these steps are presented below and are sketched in FIG. 6, which also displays the required feedback loops to the data acquisition process.

Figure 6:
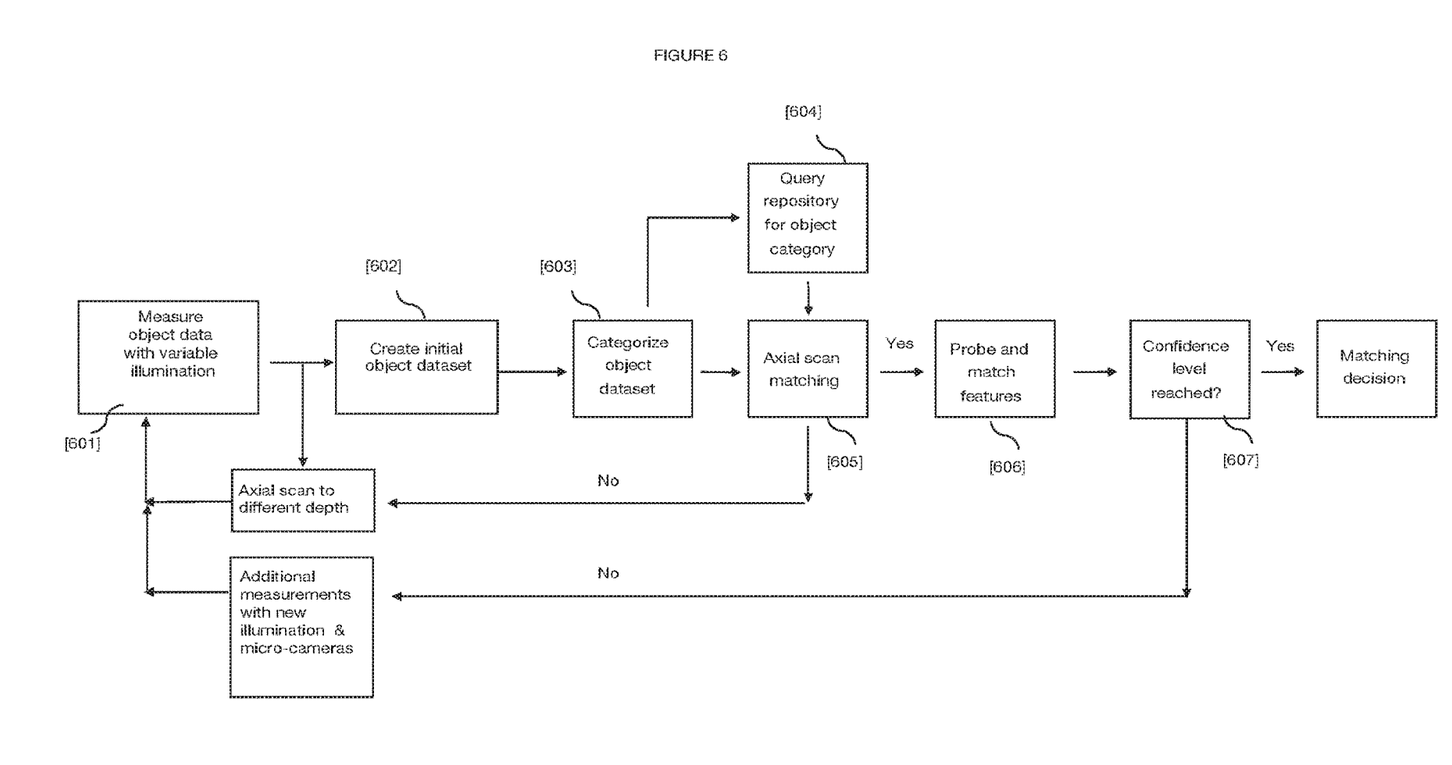
FIG. 6 shows a post-processing process steps on an initial dataset D.

A. Latent representation transformation: After the object data has been acquired in [601], the initial dataset D (and any subsequently acquired dataset) is digitally transformed into a "latent representation" in [602]. The purposes of transforming the acquired optical data to a latent representation is to increase the robustness of the data to noise and/or motion, to prepare the data for accurate and efficient analysis, and to potentially reduce the size of the total dataset for faster processing and more practical data storage requirements. This transformation can take on a variety of forms. In one preferred embodiment, the latent transformation can be a wavelet transformation, which can be used to help reduce the total dataset size. Alternatively, a discrete Fourier transformation could be applied to each image, or the invention can use transformation based on a set of learned filters. The latent transformation can additionally include an image stitching procedure, wherein the images acquired by the i different cameras $D(x,y,i)$ are combined together into a contiguous map of the $(x,y)$ coordinates of the object of interest, $E(x,y)$. The latent transformation can additionally include a compression procedure, which reduces the total number of bits stored within D. Finally, the latent transformation can additionally include a hashing transformation, which increases the entropy within the dataset D via a fixed transformation. In any case, the latent representation can execute any or all of the above simple, fixed digital transformations to convert the dataset D into a "latent dataset" E. We note that in one preferred embodiment, the latent transformation is executed on the data processing unit, which will often offer a more efficient way to compute the transformation. In a second preferred embodiment, one first step of the latent transformation is executed on the data processing unit, while a second step of the latent transformation is executed on the computer.

B. Category assignment. Once the dataset is transformed into a latent dataset, the next step is to establish an appropriate set of categories for subsequent post-processing in [603]. In the category assignment step of the matching process, the goal is to categorize the object into a subset of many pre-defined object categories for which data has been collected before. In one preferred embodiment, an object category is a defined set of objects—for example, paintings, drawings, sketches, and prints are 4 separate categories, and the goal might be to establish that the object is a painting. In a second preferred embodiment, an object category is an abstract delineation between previously acquired datasets. For example, it can represent a set of boundaries (e.g., classification boundaries) or operations (e.g., k-means clustering operations) that help define 4 unique data categories from a set of previously acquired data, and the might be to establish that the object is a part of category 2 out of the 4 possible categories.

In either case, the invention will have a predefined set of N categories, and the goal of category assignment is to assign the current dataset to a subset M of the total N categories, where M<N. In one preferred embodiment, this assignment process is achieved via a hierarchical cascade of classifiers; each one narrowing down the specific category of the object being scanned from the broadest category, progressively more specific, down to the specific object (or possibly, subregion of that object). For example, this cascaded category assignment process might process as Art→Oil on Canvas→Impressionist→Monet→"Water Lillies" Series→"Water-Lily Pond", 1926. In this example, the dataset has been assigned to 6 categories, where each category is more specific than the proceeding categories.

To achieve category assignment, in one preferred embodiment, this invention uses "trained" category classifiers. The trained classifiers are constructed and fine-tuned using a (possibly previously acquired) dataset of latent representations of a wide variety of objects and their corresponding category hierarchies. For example, a large set of previously acquired datasets may be used to occupy a large set of hierarchical tables, where there is one table for each hierarchy level, and a distance metric is used to establish a similarity score between the current dataset and each category within each hierarchy level, such that the dataset is assigned to the category with the lowest distance metric at the highest hierarchy level, and is then compared to any objects within the next (second) hierarchy level, where once again a set of similarity scores are computed and the dataset is assigned to a second category, etc. This process can require the need to query an existing data repository [604]. It can be repeated for a large number of hierarchy levels, such as 6 hierarchy levels in the Monet Water Lillies example outlined above.

C. Axial offset analysis: It is challenging to reposition a 3D object exactly along the axial dimension (i.e., along z). Objects can also change their appearance and shape, e.g., become bent or warped over time, which alters their thickness. Furthermore, different micro-cameras within the system may be at different focal settings (i.e., not focused at the same axial position, see FIG. 3). To address these engineering challenges, while still offering the ability to perform accurate objecting matching at high resolution, this invention includes an analysis step termed axial offset analysis in [605]. This step occurs during category assignment, and leads to a feedback loop between the post-processing and the acquisition hardware to ensure the quality of acquired data is high enough to achieve accurate performance.

Axial offset analysis helps establish how close one set of acquired images are along the axial direction (i.e., along the z-axis), to any previously acquired datasets that have already been assigned to one or more categories. In one preferred embodiment, closeness can be measured in terms of a set of distances along the z-axis at one or more locations across the object surface. To achieve axial offset analysis, we compare the dataset under investigation, E, to a subset of previously acquired datasets [E']. For each previously acquired dataset E' in [E'], this invention compares the data acquired along the axial dimension of each dataset (i.e., the set of K images along the $5^{th}$ dimension of E(x,y,i,j,k,l) and E'(x,y,i,j,k,l))) at one or more patches. Patches are subsets of the dataset E and E' along the (x,y) dimension. For example, if each micro-camera image is 1000 pixels along x and 1000 pixels along y, one patch might contain the pixels from 2-102 along x and 10-100 along y, while another patch might contain the pixels from 205-250 along x and 900-920 along y.

By using image blur caused by image defocus as a cue, axial offset analysis attempts to determine the amount of axial offset between the z-scan position of E and E' at the plurality of patches within a plurality of micro-cameras. A sketch of this process is shown in FIG. 6, for two different image patches. For image patch A, there is an axial offset of −1 step between the dataset E for Object A and the dataset E' for Object B, where here we use −1 as an arbitrary unit of distance along the axial direction. This is seen by the similarity in appearance of the object feature within patch A (the triangle) one axial scan step apart. In one preferred embodiment, the axial offset analysis measures the similarity in appearance of each patch using a sharpness metric, such as the sum of the gradient of each patch of dataset E and E' along x and y, and then determining the minimum value of this sum along the axial dimension of each dataset. The difference between the sharpness metrics from datasets E and E' can be used to form a "matching score". In any case, for one or more patches within each micro-camera image, we estimate the amount of axial scan offset, and then digitally account for this offset, i.e., shift the dataset E' along the $5^{th}$ dimension by the axial offset amount to more closely match the dataset E in terms of dataset similarity, before finalizing category assignment and proceeding to the probe matching step outlined below.

Figure 7:
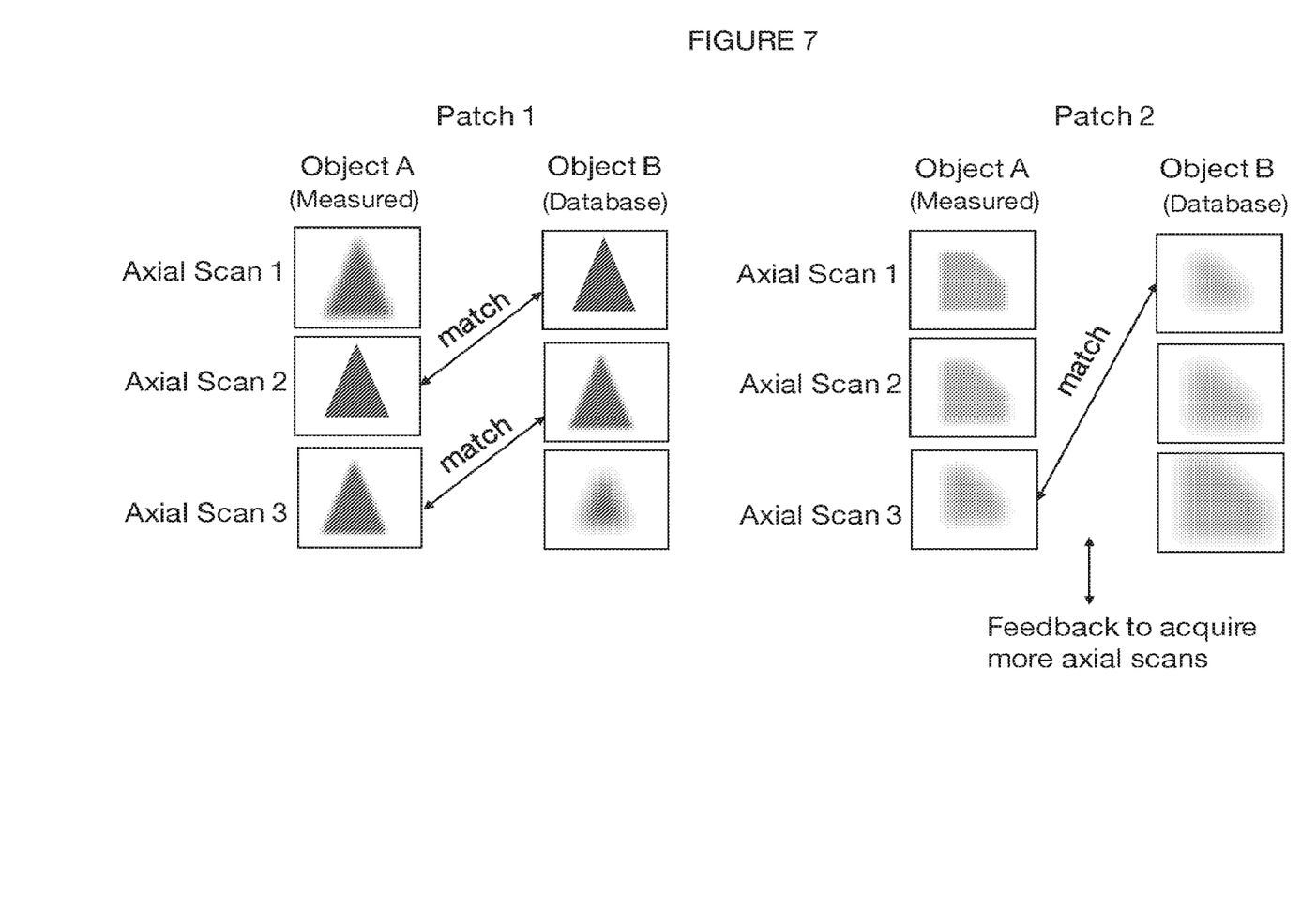
FIG. 7 shows an example of an axial scan.

If the axial offset is outside the range of analysis, feedback to the acquisition device is used to acquire additional axial scans. An example of this type of situation is shown in FIG. 7 for patch 2. Here, it is clear that the axial position for Object A during Scan 3 produces an image that is similar to the image captured for Object B during Scan 1. However, since there is only one match in these datasets that contain image data from 3 axial scan positions, it would be beneficial to acquire additional axial scans to encourage a larger number of matches and/or a better matching score. In one preferred embodiment, feedback can take the form of an instruction from the post-processing algorithm that is sent to the data processing unit or directly to the 3D controllable stage that the sample is on, to then re-position the sample at one or more new locations, along with an additional instruction sent to the sensor array and illumination unit to acquire more data in a specific configuration. One additional axial scans have been captured, this additional data can be added to the original dataset E to form an enlarged dataset F. The system can repeat the above axial offset analysis process to determine new estimates of axial offset and matching scores between the enlarged dataset F and any previously acquired datasets E' in the set [E']. Once a set of axial offsets and matching score estimates for a certain number of datasets E' in the set [E'] are below a pre-determined accuracy threshold, the post-processing system then proceeds to the next step of probe matching.

D. Probe matching: To both assist with category assignment, and in addition to determine a set of final match scores after category assignment, the fourth component of dataset post-processing uses a probe matching algorithm [606]. An object is comprised of many (potentially infinite in number) subregions or differing dimensions. For practical reasons, sets of regions can be constrained to be of a certain shape and size, and to only have a certain degree of overlap or spacing between them. Such regions are hereby defined as 'patches'.

For the newly acquired dataset E, or its enlarged version F, the probe matching algorithm examines multiple patches p. We will index this as E(p1, p1, :, :, :), where p1 denotes patch one and the colon denotes that we are considering all of the data along that particular dimension of the entire dataset. That is, each patch also contains data from multiple illumination patterns, axial scan positions and rotations. The goal of the probe matching algorithm is to establish matching scores between E(p1, p1, :, :, :) and E'(p1, p1, :, :, :) for many different datasets E' in the set [E'], as well as a number of candidate patch locations (i.e., probe locations) pi, for i=1 to a certain number q>1. In one preferred embodiment, these candidate patch locations can be randomly chosen from a larger set of possible patch locations. In any case, the probe matching algorithm examines features within patch pi for the dataset E(pi, pi, :, :, :) and E'(pi, pi, :, :, :), and connects these features. Note here that E and E' are latent representations of the originally acquired datasets D and D', respectively. In one preferred embodiment, feature examination takes the form of the computing the sum of the mean-squared error between the data values within the patch E(pi, pi, :, :, :) and E'(pi, pi, :, :, :), for all patches under consideration, to produce a feature examination score between E and E'. In a second preferred embodiment, feature examination takes the form of the computing a distance metric between one or more different feature locations within the patch E(pi, pi, :, :, :) and E'(pi, pi, :, :, :), and subsequently computing the sum of these distance metrics to form the feature examination score. Particular patches of the imaged object and its dataset E can return a high feature examination score, suggesting a match between patches, without necessarily matching patches from across the whole object in its entirety. This is important when a valuable object can be broken into pieces and reassembled into multiple copies of the original, where each copy is only partially genuine.

In any case, the output of the probe matching step is a set of feature examination scores between the current dataset E and one or more datasets E' in the set [E'].

E. Confidence analysis and acquisition feedback: After probe matching is completed for more than one patch location in dataset E and for one or more datasets E' within the set [E'], the post-processing performs a confidence analysis to establish a final metric for object uniqueness. This confidence analysis in [607] uses the set of feature examination scores, and compares them against one another, to establish a final set of confidence values between the current dataset E and one or more datasets E' in the set [E'], which can also be understood as a set of probability distributions defining the probability of the current object (dataset E) being the same as one or more previously measured objects (E').

Subsequent to generating confidence scores, depending on the results, the post-processing system can algorithmically select the specific locations or a probabilistic distribution of other patches that need to be further imaged. That is, additional patches within E and E' can be considered without acquiring new data, and the above process can be repeated to increase the statistical accuracy of the final confidence scores. In addition, if the final values of the established confidences scores are below a particular threshold, feedback to the acquisition device can be used to acquire data from additional micro-cameras, patches, and/or under different forms of patterned illumination as needed to attain desired confidence intervals. This additional data can be used to once again augment the dataset E into an enlarged dataset F along any of its dimensions, and the above post-processing analysis can once again be repeated in its entirety. This data acquisition and processing feedback loop is diagrammed in FIG. 6, and plays an important role in establishing matching scores between the current object and previously examined objects that exhibit a high degree of confidence.

In some embodiments, the present invention discloses an optical measurement, control, and processing system. The optical measurement, control, and processing system includes a number of photo-electrical imaging devices mechanically coupled to each other, spaced out so as to acquire optical measurements of distinct regions of the same artifact. The optical measurement, control, and processing system further includes a number of illumination sources, each configured to send patterned illumination to the object, with adjustable amplitudes and colors/wavelengths of light. The optical measurement, control, and processing system further includes a stage for holding up a given artifact at a specific position relative to the imaging and illumination devices. The optical measurement, control, and processing system further includes a control system that can measure and adjust the distance as well as the 3D rotation of the specimen (i.e. via the stage) relative to the imaging and illumination devices. The optical measurement, control, and processing system further includes processing circuitry configured to convert the acquired optical measurements into a per-specimen feature vector output In some embodiments, the stage of the optical measurement, control, and processing system is mechanically coupled to the imaging and illumination devices, either directly (e.g., by attached to each other) or indirectly (e.g., by placed in the same room or work area, with the ability to accurately measure its relative positioning, such as by using a separate gantry system, for example).

In some embodiments, the output feature vector converted from the acquired optical measurements is automatically analyzed using computational processing circuitry, e.g., via an on-board microchip or via communication with an external computer and corresponding software system.

In some embodiments, after each optical acquisition and processing step, the control system of the optical measurement, control, and processing system is then instructed to reposition the artifact so as to acquire more data in a specific manner, e.g. to fix for blurry or obstructed views of the artifact, or to focus in on specific regions of interest of the artifact.

In some embodiments, the output feature vector is sampled, e.g., uniformly in a predefined pattern, randomly, or using some apt automatic selection, wherein each sample results in a probe which encodes uniqueness information about the specific corresponding region of the artifact. The probes resulted from the sample can be tuned to allow for slight rotational and positional offsets from the original probe location, such as identifying a match between a specific point and orientation on an artifact and other points that are within a specified distance and orientation from the original point. The probes resulted from the sample can be tuned to allow for slight alterations from the original artifact, such as surface degradation due to aging, erosion, warping due to moisture, tears, and overpainting, to name a few. The probes resulted from the sample can be tuned to adjust between false positive and false negative rates, statistically based on a dataset of previously imaged artifacts. The set of probes, which are electronically stored as bits, are digitally encrypted and saved in a secure manner.

In some embodiments, the set of probes are compared against a database of previously acquired probes, from which a match decision and corresponding confidence score can be inferred. A match confidence is displayed at a high-resolution, such as a heat map overlaid on the image of an artifact, visually representing the confidence of each respective region of the object visible in the image, using a GUI. A human user, upon analyzing the match-confidence visualization, can manually select specific sub-regions to re-image or focus on, via a GUI. The set of probes are compared against a database of previously acquired high-resolution photographic images, from which a match decision and corresponding confidence can be inferred. The probes can be tuned to select for different physical textures, such as canvas types, artistic styles, brush-stroke or sculpting patterns. The probes are compared against a previously collected database of labeled artifacts, from which a given imaged artifact is placed in a hierarchy corresponding to increasingly specific attribution.

INDUSTRIAL APPLICABILITY

The invention has been explained in the context of several embodiments already mentioned above. There are a number of commercial and industrial advantages to the invention that have been demonstrated. These include the ability to establish whether a physical object under investigation is the same object or a different object than one investigated previously, the ability to form matching scores between different objects that are three dimensional, and the ability to acquire, store and compare gigabyte-sized datasets that contain high-resolution optical information from three dimensional objects. The invention also provides in varying embodiments additional commercial benefits like the ability to establish physical object uniqueness, to store within a database a large number of datasets that represent the physical condition of a plurality of physical objects, to name a few. While the invention was explained above with reference to the aforementioned embodiments, it is clear that the invention is not restricted to only these embodiments, but comprises all possible embodiments within the spirit and scope of the inventive thought and the following patent claims.

CITATION LIST

Patent Literature

[Fraser] Fraser et al., Authentication method and system, U.S. Pat. No. 9,818,249B1
[Jung] Jung et al., DNA marking of previously undistinguished items for traceability, U.S. Pat. No. 9,266,370B2
[Bi] D. Bi et al., Retroreflective security features in secure documents, U.S. Pat. No. 8,062,735B2
[DiVenuto] C. Di Venuto et al., Means for using microstructure of materials surface as a unique identifier, U.S. Pat. No. 2,180,174 (2008)
[Ito] K. Ito and T. Kimura, Object identification system and program, U.S. Pat. No. 9,396,414 (2014)

Non-Patent Literature

[Riederer] Josef Riederer. The detection of art forgeries with scientific methods. In Forensic science progress, pages 153-168. Springer, 1986.
[Dong] J. Dong, A. Locquet, M. Melis and D. S. Citrin, "Global mapping of stratigraphy of an old-master painting using sparsity-based terahertz reflectometry," Nature Sci. Rep. 7, 15098 (2017)
[Hwang] S. Hwang et al., "Optical measurements of paintings and the creation of an artwork database for authenticity," PLOS One (2017).
[Elgammal] A. Elgammal et al., "Picasso, Matisse, or a Fake? Automated analysis of drawings at the stroke level for attribution and authentication," arXiv: 1711.03536v1
[Strezowski] G. Strezowski and M. Worring, "OmniArt: Multi-task Deep Learning for Artistic Data Analysis," arXiv:1708.00684v1 (2017), available at: https://arxiv.org/pdf/1708.00684

What is claimed is:
1. A system comprising
multiple imaging devices,
   wherein the multiple imaging devices are configured to acquire a dataset comprising optical measurements of distinct regions of a sample;
multiple illumination sources,
   wherein the multiple illumination source are configured to send one or more illumination patterns to the sample;
a stage,
   wherein the stage is configured to support the sample;
a control system,
   wherein the control system is coupled to the multiple imaging systems for receiving the dataset,
   wherein the control system is configured to process the dataset,
   wherein processing the dataset comprises categorizing the dataset either by assigning the dataset to a subset of a set of multiple pre-defined categories with the multiple pre-defined categories classified using datasets of objects acquired previously or by assigning the dataset to an abstract delineation generated between the multiple pre-defined categories,
   wherein processing the dataset comprises a probe matching process between regions of the dataset and the previously acquired datasets assigned to the subset of the set of the multiple pre-defined categories after categorizing the dataset to produce feature examination scores,
   wherein the feature examination scores are related to degrees of matching between the regions of the dataset and the previously acquired datasets,
   wherein processing the dataset comprises a confidence analysis after the probe matching process to establish a set of confidence values between the regions of the dataset and the previously acquired datasets for accessing uniqueness of the sample.

2. A system as in claim 1,
wherein processing the dataset comprises transforming the dataset into a latent representation to increase data robustness with respect to noise or motion, to prepare the data for analysis, or to reduce sizes of the dataset.

3. A system as in claim 2,
wherein transforming the dataset comprising a wavelet transformation, a transformation based on a set of learned filters, an image stitching procedure for combining the dataset into a contiguous map of the sample, a compression procedure to reduce sizes of the dataset, or a hashing transformation to increase an entropy of the dataset.

4. A system as in claim 1,
wherein the assignment process is achieved via a hierarchical cascade of classifiers, with each classifier narrowing down from a broadest category to a more specific category, or by determining a lowest distance metric at a highest hierarchy level and continuing to lower hierarchy levels.

5. A system as in claim 1,
wherein categorizing the dataset comprises an axial offset analysis, and an axial offset shifting and a feedback loop based on the axial offset analysis to ensure that the dataset having a quality high enough to achieve accurate categorizing performance.

6. A system as in claim 1,
wherein the probe matching process comprises computing a sum of mean squared errors between the regions of the dataset and the previously acquired datasets, or computing a distance metric between one or more different feature locations within the regions of the dataset and the previously acquired datasets.

7. A system as in claim 1,
wherein the probe matching process comprises computing tuning to allow for rotational and positional offsets, for alterations or surface degradation due to aging, erosion, moisture warping, or tear, or to select for different physical textures.

8. A system as in claim 1,
wherein processing the dataset further comprises selecting additional regions of the dataset for the confidence analysis to increase a statistical accuracy,
wherein the control system is configured to instruct the multiple imaging devices to acquire additional optical measurements to repeat the categorizing, the probe matching process and the confidence analysis to attain desired confidence intervals.

9. A system comprising
multiple imaging devices,
  wherein the multiple imaging devices are configured to acquire a dataset comprising optical measurements of distinct regions of a sample;
multiple illumination sources,
  wherein the multiple illumination source are configured to send one or more illumination patterns to the sample;
a stage,
  wherein the stage is configured to support the sample;
a control system,
  wherein the control system is coupled to the multiple imaging systems for receiving the dataset,
  wherein processing the dataset comprises transforming the dataset into a latent representation to increase data robustness with respect to noise or motion, to prepare the data for analysis, or to reduce sizes of the dataset,
  wherein transforming the dataset comprising a wavelet transformation, a transformation based on a set of learned filters, an image stitching procedure for combining the dataset into a contiguous map of the sample, a compression procedure to reduce sizes of the dataset, or a hashing transformation to increase an entropy of the dataset,
  wherein processing the dataset comprises categorizing the dataset either by assigning to a subset of a set of multiple pre-defined categories or by generating an abstract delineation between the multiple pre-defined categories,
  wherein the assignment process is achieved via a hierarchical cascade of classifiers, with each classifier narrowing down from a broadest category to a more specific category, or by determining a lowest distance metric at a highest hierarchy level and continuing to lower hierarchy levels,
  wherein categorizing the dataset comprises an axial offset analysis, and an axial offset shifting and a feedback loop based on the axial offset analysis to ensure that the dataset having a quality high enough to achieve accurate categorizing performance,
  wherein the axial offset analysis is configured to determine an offset amount along an axial direction between the dataset and the previously acquired datasets assigned to the multiple pre-defined categories,
  wherein the offset amount is measured by using a set of distance along the axial direction at one or more locations across a surface of the sample, by using image blur caused by image defocus, or by using a sharpness metric,
  wherein the axial offset shifting comprises shifting the previously acquired datasets to match the dataset more closely,
  wherein the feedback loop comprises instructing the multiple imaging devices to acquire additional optical measurements based on the axial offset analysis to better match the dataset,
  wherein processing the dataset comprises a probe matching process between regions of the dataset and the previously acquired datasets assigned to the multiple pre-defined categories after categorizing the dataset to produce feature examination scores,
  wherein the probe matching process comprises examining features in regions of the dataset and the previously acquired datasets,
  wherein the probe matching process comprises computing a sum of mean squared errors between the regions of the dataset and the previously acquired datasets, or computing a distance metric between one or more different feature locations within the regions of the dataset and the previously acquired datasets,
  wherein the probe matching process comprises computing tuning to allow for rotational and positional offsets, for alterations or surface degradation due to aging, erosion, moisture warping, or tear, or to select for different physical textures,
  wherein the feature examination scores are related to degrees of matching between the regions of the dataset and the previously acquired datasets,
  wherein processing the dataset comprises a confidence analysis after the probe matching process to establish a set of confidence values between the regions of the dataset and the previously acquired datasets for accessing uniqueness of the sample,
  wherein the confidence analysis comprises comparing the feature examination scores against one another,
  wherein processing the dataset further comprises selecting additional regions of the dataset for a confidence analysis,
  wherein the control system is configured to instruct the multiple imaging devices to acquire additional optical measurements to attain desired confidence intervals.

10. A system comprising
multiple imaging devices,
  wherein the multiple imaging devices are configured to acquire a dataset comprising optical measurements of distinct regions of a sample;
multiple illumination sources,
  wherein the multiple illumination source are configured to send one or more illumination patterns to the sample;
a stage,
  wherein the stage is configured to support the sample;
a control system,
  wherein the control system is coupled to the multiple imaging systems for receiving the dataset,
  wherein the control system is configured to process the dataset,
  wherein processing the dataset comprises categorizing the dataset either by assigning to a subset of a set of multiple pre-defined categories or by generating an abstract delineation between the multiple pre-defined categories, wherein processing the dataset comprises a probe matching process between regions of the dataset and previously acquired datasets assigned to the multiple pre-defined categories after categorizing the dataset to produce feature examination scores, wherein the feature examination scores are related to degrees of matching between the regions of the dataset and the previously acquired datasets, wherein processing the dataset comprises a confidence analysis after the probe matching process to establish a set of confidence values between the regions of the dataset and the previously acquired datasets for accessing uniqueness of the sample, wherein categorizing the dataset comprises an axial offset analysis, and an axial offset shifting and a feedback loop based on the axial offset analysis to ensure that the dataset having a quality high enough to achieve accurate categorizing performance, wherein the axial offset analysis is configured to determine an offset amount along an axial direction between the dataset and the previously acquired datasets assigned to the multiple pre-defined categories, wherein the offset amount is measured by using a set of distance along the axial direction at one or more locations across a surface of the sample, by using image blur caused by image defocus, or by using a sharpness metric, wherein the axial offset shifting comprises shifting the previously acquired datasets to match the dataset more closely, wherein the feedback loop comprises instructing the multiple imaging devices to acquire additional optical measurements based on the axial offset analysis to better match the dataset.

11. A system as in claim 10,
wherein processing the dataset comprises transforming the dataset into a latent representation to increase data robustness with respect to noise or motion, to prepare the data for analysis, or to reduce sizes of the dataset.

12. A system as in claim 11,
wherein transforming the dataset comprising a wavelet transformation, a transformation based on a set of learned filters, an image stitching procedure for combining the dataset into a contiguous map of the sample, a compression procedure to reduce sizes of the dataset, or a hashing transformation to increase an entropy of the dataset.

13. A system as in claim 10,
wherein the assignment process is achieved via a hierarchical cascade of classifiers, with each classifier narrowing down from a broadest category to a more specific category, or by determining a lowest distance metric at a highest hierarchy level and continuing to lower hierarchy levels.

14. A system as in claim 10,
wherein the probe matching process comprises computing a sum of mean squared errors between the regions of the dataset and the previously acquired datasets, or computing a distance metric between one or more different feature locations within the regions of the dataset and the previously acquired datasets.

15. A system as in claim 10,
wherein the probe matching process comprises computing tuning to allow for rotational and positional offsets, for alterations or surface degradation due to aging, erosion, moisture warping, or tear, or to select for different physical textures.

16. A system as in claim 10,
wherein processing the dataset further comprises selecting additional regions of the dataset to increase the confidence values,
wherein the control system is configured to instruct the multiple imaging devices to acquire additional optical measurements to repeat the categorizing, the probe matching process and the confidence analysis to attain desired confidence intervals.

* * * * *